United States Patent

Tarolli et al.

Patent Number: 5,822,452
Date of Patent: Oct. 13, 1998

[54] SYSTEM AND METHOD FOR NARROW CHANNEL COMPRESSION

[75] Inventors: Gary Tarolli, Concord, Mass.; Scott Sellers, Menlo Park, Calif.; James E. Margeson, III, Santa Clara, Calif.; Murali Sundaresan, Sunnyvale, Calif.

[73] Assignee: 3Dfx Interactive, Inc., San Jose, Calif.

[21] Appl. No.: 641,208

[22] Filed: Apr. 30, 1996

[51] Int. Cl.$^6$ ...................................................... G06K 9/00
[52] U.S. Cl. ........................... 382/166; 382/232; 345/431
[58] Field of Search ..................................... 382/232, 166; 395/131; 345/139, 431

[56] References Cited

U.S. PATENT DOCUMENTS

| | | | |
|---|---|---|---|
| 4,905,164 | 2/1990 | Chandler | 395/131 |
| 4,965,745 | 10/1990 | Economy et al. | 364/518 |

Primary Examiner—Jose L. Couso
Assistant Examiner—Anh Hong Do
Attorney, Agent, or Firm—Fenwick & West LLP

[57] ABSTRACT

A system and method for compressing and decompressing a texture image that: (1) compresses each texel to 8 bits, and when decompressed, each texel is of a quality comparable to a 256 color palettized image; (2) increases the efficiency of the decompression system and method by eliminating complex operations, e.g., multiplication; and (3) increases the efficiency of the system and method when switching between textures that use different palettes, when compared to conventional system and methods. The invention compresses a texture image, stores the compressed texture image, and quickly and efficiently decompresses the texture image when determining a value of a pixel. The texture image compression technique utilizes a palletized color space that more closely matches the colors in the texture image while allocating an unequal number of bits to the color channels. Each texel in the texture image is converted to an 8-bit value in the selected color space, and a decompression table is generated that represents the RGB values for the each texel stored in the selected color space. In order to map the texture image to the object, one or more texels that are associated with each pixel are decompressed. The present invention quickly and efficiently decompresses each texel using a hardware decompression unit. The decompression unit does not perform any multiplication operations.

13 Claims, 10 Drawing Sheets

| Y Index | Y Value |
|---|---|
| 0000 | 20 |
| 0001 | 32 |
| 0010 | 43 |
| 0011 | 55 |
| 0100 | 66 |
| 0101 | 78 |
| 0110 | 89 |
| 0111 | 101 |
| 1000 | 112 |
| 1001 | 124 |
| 1010 | 135 |
| 1011 | 147 |
| 1100 | 158 |
| 1101 | 170 |
| 1110 | 181 |
| 1111 | 193 |

FIGURE 6A

| A Index | A Value |
|---|---|
| 00 | -27 |
| 01 | -8 |
| 10 | 9 |
| 11 | 28 |

FIGURE 6B

| B Index | B Value |
|---|---|
| 00 | -10 |
| 01 | -5 |
| 10 | 0 |
| 11 | 4 |

FIGURE 6C

| Decomp. Table Address | Decompression Table Value |
|---|---|
| 0 | 0x372b2014 |
| 1 | 0x65594e42 |
| 2 | 0x93877c70 |
| 3 | 0xclb5aa9e |
| 4 | 0x079c0eld |
| 5 | 0x07e00409 |
| 6 | 0x0027fbf6 |
| 7 | 0x006ffleI |
| 8 | 0x07e80def |
| 9 | 0x07f407f7 |
| 10 | 0x00000000 |
| 11 | 0x000bfa07 |

FIGURE 7

SYSTEM AND METHOD FOR NARROW CHANNEL COMPRESSION

CROSS-REFERENCES TO RELATED APPLICATIONS

The subject matter of this application is related to the subject matter of the following applications:

application Ser. No. 08/552,740, entitled "TEXTURE COMPOSITING APPARATUS AND METHOD", filed on 03 Nov. 1995, by Gary Tarolli, Scott Sellers, and James E. Margeson, III; and application Ser. No. 08/640,450, entitled "SYSTEM AND METHOD FOR LEVEL OF DETAIL DITHERING", filed on 30 Apr. 1996, by Gary Tarolli, Scott Sellers, and James E. Margeson, III;

U.S. patent application Ser. No. 08/640,070, entitled "SYSTEM AND METHOD FOR SELECTING A COLOR SPACE USING A NEURAL NETWORK", filed on 30 Apr. 1996, by Murali Sundaresan;

all of the above applications are incorporated by reference herein in their entirety.

BACKGROUND OF THE INVENTION

1. Field of the Invention

The present invention relates generally to the field of image processing, and more particularly to the field of texture image data compression.

2. Description of Background Art

Recent advances in computer performance have enabled graphic systems to provide more realistic graphical images using personal computers and home video game computers. In such graphic systems, some procedure must be implemented to "render" or draw graphic primitives to the screen of the system. Graphic primitives are basic components of a graphic picture, for example a polygon or a vector. All graphic pictures are formed with combinations of these graphic primitives and many procedures may be utilized to perform graphic primitive rendering.

Conventional graphic systems perform such graphic primitive rendering procedures using a frame buffer. A frame buffer generally includes a plurality of computer memory chips that store information concerning pixel activation on the system's display screen. Generally, the frame buffer includes all of the graphic data information that will be written onto the screen.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or function onto a surface in three dimensions. Texture mapping is a relatively efficient technique for creating the appearance of a complex image without the tedium and computational cost of rendering three dimensional detail that might be found on a surface of an object.

Many parameters have been texture mapped in conventional systems. Some of these parameters include surface color, specular reflection, normal vector perturbation, specularity, transparency, diffuse reflections, and shadows. In texture mapping, a source image known as the "texture" is mapped onto a surface in three dimensional space. The three dimensional surface is then mapped to the destination image. The destination image is then displayed on a graphic display screen. Examples of the texture of an object include the gravel on a highway or scuff marks on a wooden surface.

A texture map comprises texture elements, i.e., texels. The values of these texels are stored in texture memory. Texture memory is a valuable and scarce resource in a graphics system. In order to more efficiently utilize the texture memory, the data representing the texture map can be compressed. In conventional systems, each texel is represented as a 16-bit or 24-bit value in the red-green-blue (RGB) color space. When each texel is 16-bits, the red color component can be represented with 5-bits, the green color component can be represented with 6-bits, and the blue color component can be represented with 5-bits. When the texels in a texel map are represented in this manner, the texel representation is called an RGB565 image. Similarly, a texel can be represented as a 24-bit value with each color component (channel) represented with 8-bits. Such a texel representation is called a RGB888 image.

A first conventional technique for compressing data in a texture map is to reduce the RGB565 image or the RGB888 image to a RGB332 image. That is, the 16-bit image or 24 bit-image is reduced to an 8-bit image. When reducing a RGB888 image to a RGB332 image, the number of bits representing each color channel contribution to the texel is reduced from 8-bits to 3-bits, for the red channel and the green channel, and from 8-bits to 2-bits, for the blue channel. One technique for reducing the number of bits used for each color channel is to use only the most significant bits from the uncompressed image. For example, if a RGB888 image is reduced to a RGB332 image the compressed 3-bit representation is equal to the three most significant bits (MSB) of the uncompressed 8-bit red channel representation. The compressed 3-bit green channel representation is equal to the three MSB's of the uncompressed 8-bit green channel representation. Similarly, the compressed 2-bit blue channel representation is equal to the two MSB's of the uncompressed 8-bit blue channel representation.

A second conventional technique for reducing the number of bits used for each color channel is to determine a predefined number of MSB's, e.g., in a RGB332 image the three MSB's of the red channel of the uncompressed RGB888 image are determined. Instead of setting each texel value equal to these three bits, the values of a group of texels are dithered across an area using conventional dithering techniques. A benefit of this technique is that the hardware required to implement the data compression and data decompression is inexpensive. However, the data loss is high and the decompressed image quality is poor.

A second conventional technique for compressing data in a texture image is to palletize the texture image. When palettizing a texture image, a small palette of colors is selected, e.g., 16 or 256 colors. Each texel in the uncompressed texture image is represented by a predetermined number of bits, e.g., 16-bits, 24-bits, or 32-bits. Each texel is translated into a 4-bit or an 8-bit indexed range of colors where the indices for each texel refer to the color in the reduced palette that is closest to the color in the uncompressed image. Each color in the color palette is represented by three bytes, one byte for each color channel, e.g., red, green, and blue. A technique for reducing a color texture image to a compressed 256 color palettized image is given in Burger, *Heckbert's Median Cut Algorithm*, Interactive Computer Graphics: Functional, Procedural, and Device-Level Methods (1989) that is hereby incorporated by reference in its entirety. Accordingly, the uncompressed texel image is compressed into a 4-bit or an 8-bit palettized image, thereby compressing the texture image by a factor between 2 and 8. In many situations, compressing a 32-bit texture image into a 256 color palettized texture results in an image that is virtually indistinguishable form the uncompressed texel image.

However, there are several problems with using palettized images as textures in a graphic system. One problem with using palettized images is that if the graphic system implements bilinear filtering, described below, four texels are accessed in the texture memory when determining the value of a single pixel. If these four texel accesses occur in parallel, as is preferred, each of the four texels are simultaneously translated through a 256 color palette. The hardware for implementing this technique requires a 256 entry table of three bytes each, having four read ports. This hardware is expensive.

A second problem with using palettized images as textures in a graphics system is that when switching between textures that use different palettes, at least 768 bytes (256 colors multiplied by three bytes) are downloaded into the hardware to ensure that the new texture has the appropriate palette installed. In graphic systems where textures are frequently switched between, such a large palette size reduces the efficiency of the system.

What is needed is a system and method for compressing and decompressing a texture image that: (1) compresses each texel to 8 bits, and when decompressed, each texel is of a quality comparable to a 256 color palettized image; (2) increases the efficiency of the decompression system and method by eliminating complex operations, e.g., multiplication; (3) increases the efficiency of the system and method when switching between textures that use different palettes, when compared to conventional system and methods; and (4) automatically determines a compression color space for each texture image.

SUMMARY OF THE INVENTION

The invention is a system and method for compressing and decompressing a texture image that: (1) compresses each texel to 8 bits, and when decompressed, each texel is of a quality comparable to a 256 color palettized image; (2) increases the efficiency of the decompression system and method by eliminating complex operations, e.g., multiplication; (3) increases the efficiency of the system and method when switching between textures that use different palettes, when compared to conventional system and methods; and (4) automatically determines a compression color space for each texture image.

The method and apparatus of the present invention compresses a texture image, stores the compressed texture image, and quickly and efficiently decompresses the texture image when determining a value of a pixel. The texture image compression technique utilizes a palletized color space that more closely matches the colors in the texture image while allocating an unequal number of bits to the color channels. The texture image is, typically, a red-green-blue (RGB) color channel representation. The present invention selects a compression color space manually, or preferable, using a computer-based neural network algorithm. The invention initializes the neural network that includes an input layer of neurons and a hidden layer of neurons, e.g., Y neurons, A neurons, and B neurons. Each input layer neuron has an associated weight that is equal to the combination of the weights of a Y neuron, an A neuron, and a B neuron that is associated with each input layer neuron. The texel image is reduced into a representative sample of colors and input vectors from the texel image are randomly selected. For each input vector, the present invention determines the two input layer neurons that most closely match the input vector and modifies the weights of the two input layer neurons to more closely match the value of the input vector. The weight of the two matching input layer neurons are modified by modifying the weights of the three associated hidden layer neurons. After analyzing all input vectors, the invention determines an error value. The error value is associated with a first analysis cycle of randomly received input vectors. The cycle repeats until the error value stabilizes or is equal to zero. The weights of the hidden layer neurons represent the Y, A, and B-channel values of the optimal compression color space.

Each texel in the texture image is converted to an 8-bit value in the selected color space, and a decompression table is generated that represents the RGB values for the each texel stored in the selected color space. When rendering a pixel representing an object with a texture, the texture image is mapped to the representation of the object. In order to map the texture image to the object, one or more texels that are associated with each pixel are decompressed. The present invention quickly and efficiently decompresses each texel using a hardware decompression unit. The decompression unit includes three adders and memory for storing the decompression table. Each texel is represented by 8-bits. The 8-bits are indices into the decompression table. The decompression table represents the red, green, and blue components of pre-selected values in the YAB color space. The decompression unit combines three red components, three of green components, and three blue components to generate a 24-bit representation of each texel.

In order to switch between textures that utilize a new palette, the decompression table associated with the new palette is retrieved and stored in the decompression unit and the 8-bit texel representations are retrieved and stored in a texture memory unit.

BRIEF DESCRIPTION OF THE DRAWINGS

FIG. 6A is an illustration of a Y index and an associated Y representation value according to a first example of an embodiment of the present invention.

FIG. 6B is an illustration of an A index and an associated A representation value according to a first example of an embodiment of the present invention.

FIG. 6C is an illustration of a B index and an associated B representation value according to a first example of an embodiment of the present invention.

FIG. 7 is an illustration of a decompression table of the first example according to an embodiment of the present invention.

DETAILED DESCRIPTION OF THE PREFERRED EMBODIMENTS

A preferred embodiment of the present in described now described with reference to the figures where like reference numbers indicate identical or functionally similar elements. Also in the figures, the left most digit(s) of each reference number correspond(s) to the figure in which the reference number is first used.

Figure 1:
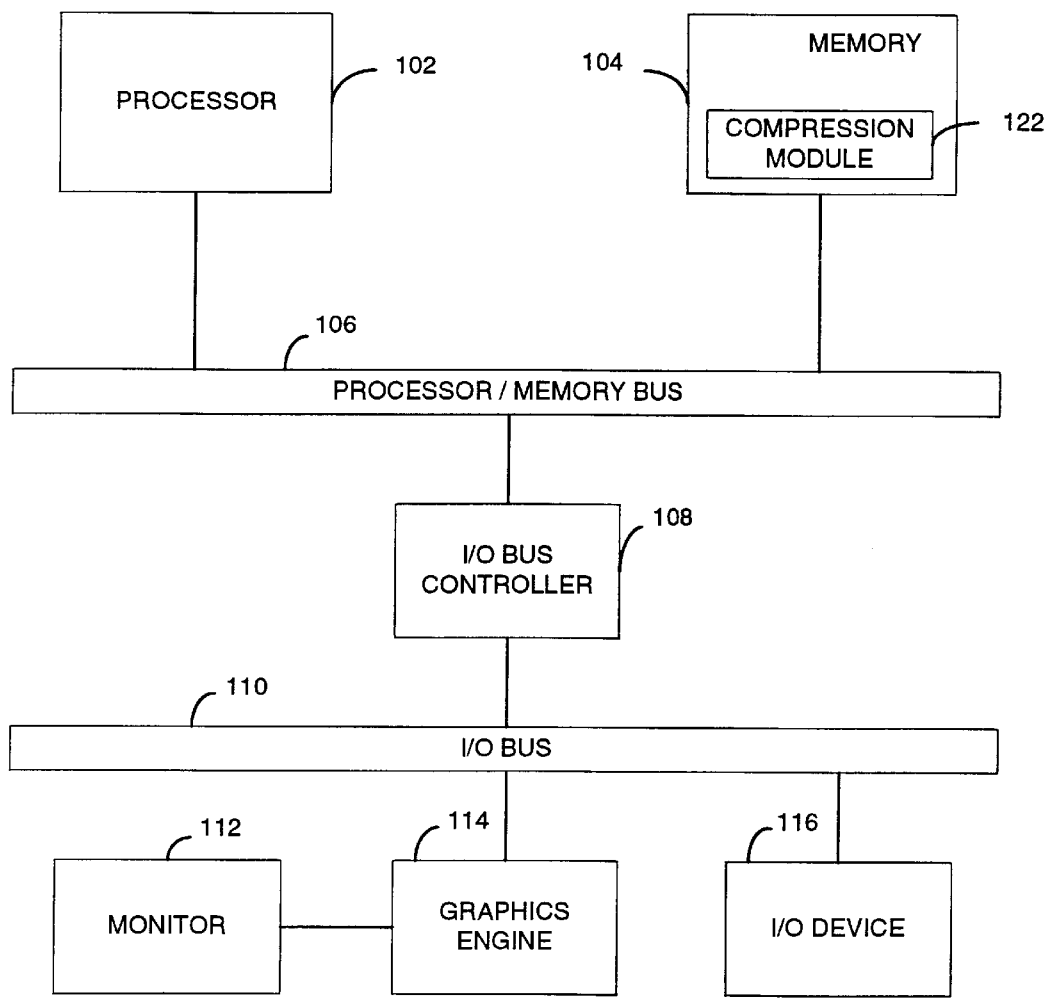
FIG. 1 is an illustration of a computer system in which the preferred embodiment of the present invention operates.

FIG. 1 is an illustration of a computer system 100 in which the preferred embodiment of the present invention operates. In the preferred embodiment, the computer system 100 is a conventional personal computer, e.g., an IBM compatible personal computer having a non-conventional graphics engine 114 and a non-conventional compression module 122 stored in conventional random access memory (RAM) 104. In an alternate embodiment, the computer system is a video game platform, e.g., a Nintendo game platform, commercially available from Nintendo of America, Inc., Redmond, Wash. In the preferred embodiment, the processor 102 of the computer system 100 is a Pentium processor, commercially available from INTEL Corporation, Santa Clara, Calif. The processor/memory bus 106 and the input/output (I/O) bus 110 are conventional. A conventional I/O bus controller 108 controls the data flow between the I/O bus 110 and the processor/memory bus 106. Conventional input/output devices 116, e.g., a keyboard, are connected to the I/O bus 110. A conventional computer monitor 112 is driven by the graphics engine unit 114. The graphics engine unit 114 is described in greater detail below with reference to FIGS. 2–11.

Figure 2:
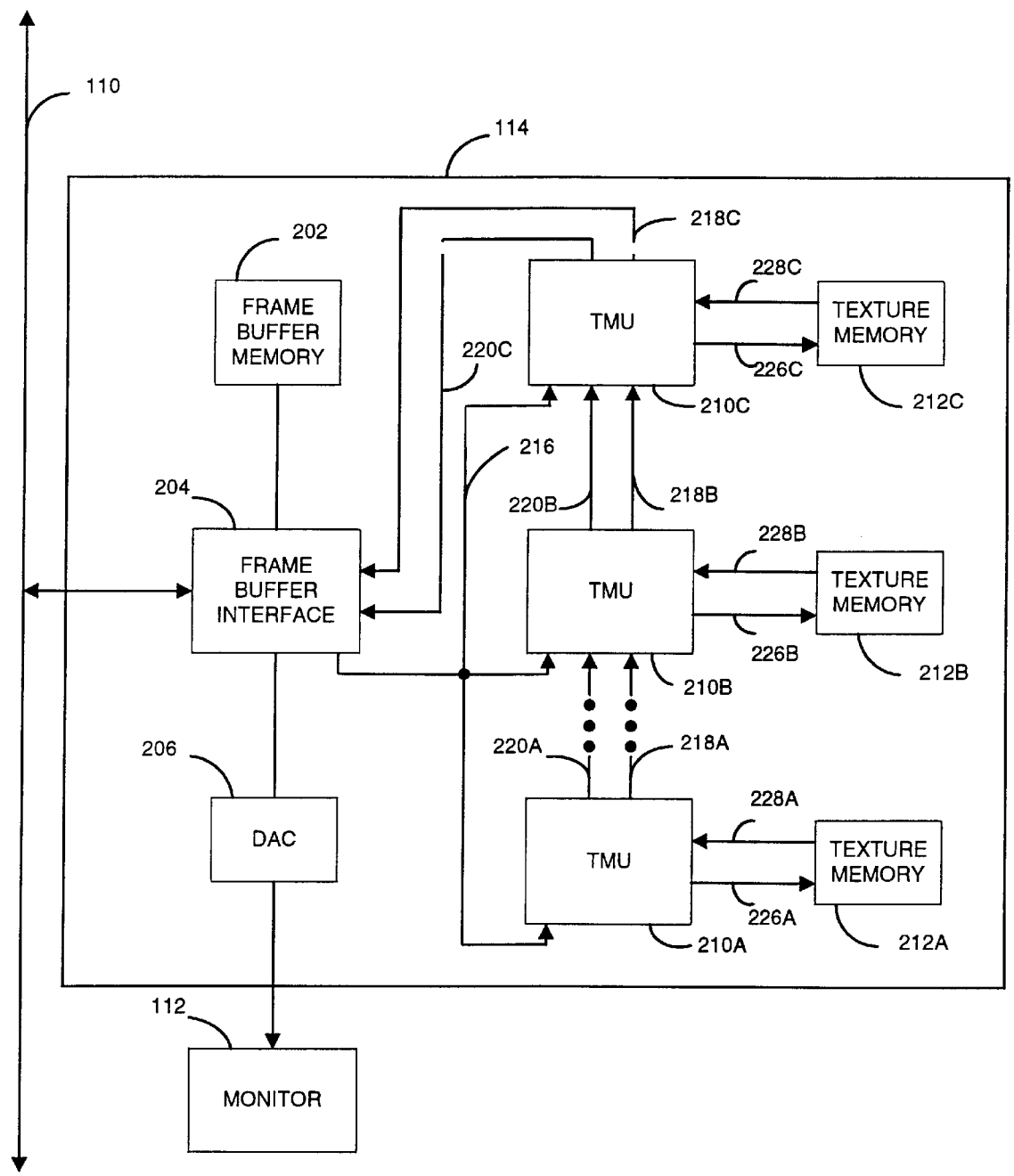
FIG. 2 is an illustration of the graphic engine of the preferred embodiment of the present invention.

FIG. 2 is an illustration of the graphics engine unit 114 of the present invention. A frame buffer interface (FBI) 204 is coupled to the I/O bus 110. The FBI 204 is also coupled to a frame buffer memory 202, a conventional digital-to-analog converter (DAC) 206, and one or more texture mapping units (TMU) 210. The DAC 206 is also coupled to the monitor 112. Each TMU 210 is also connected to a texture memory 212. The FBI 204 is, preferably, an application specific integrated circuit (ASIC) that serves as an I/O slave device, and all communication from the processor 102 to the graphics engine 114 is performed through the FBI 204. The FBI 204 implements basic three dimensional primitives including Gouraud shading, depth buffering, and dithering. The FBI 204 also controls the output to the monitor 112.

Each TMU 210 is also, preferably, an ASIC. The TMU 210 performs composite texture mapping including texture morphing, and texture filtering. The operation of the TMU 210 is described in greater detail below with reference to FIGS. 2–11. Preferably, the frame buffer memory 202 and the texture memory 212 are extended-data-out (EDO) dynamic random access memory (DRAM). The TMU 210 receives a control signal CTRL from the FBI 204 via a control signal line 216. In addition, each THU 210 receives a local texture signal from its associated texture memory 212. The local texture signal is received via a local texture signal line 228 in response to an address request from the TMU via the address signal line 226. In addition, each TMU 210 receives a texture color/alpha input signal from a previous TMU 210. The texture color/alpha input signal is received via the input/output texture color signal line 218, and the input/output texture alpha signal line 220. Each TMU 210 generates a texture color/alpha output signal. This texture color/alpha output signal is transmitted on another input/output texture color line 218 and another input/output alpha texture color line 220. The texture color value generated by the THU 210C that is the last in the chain of TMU's 210 is transmitted to the FBI 204. The TMU 210 is described in greater detail below with reference to FIGS. 3–11.

Figure 3:
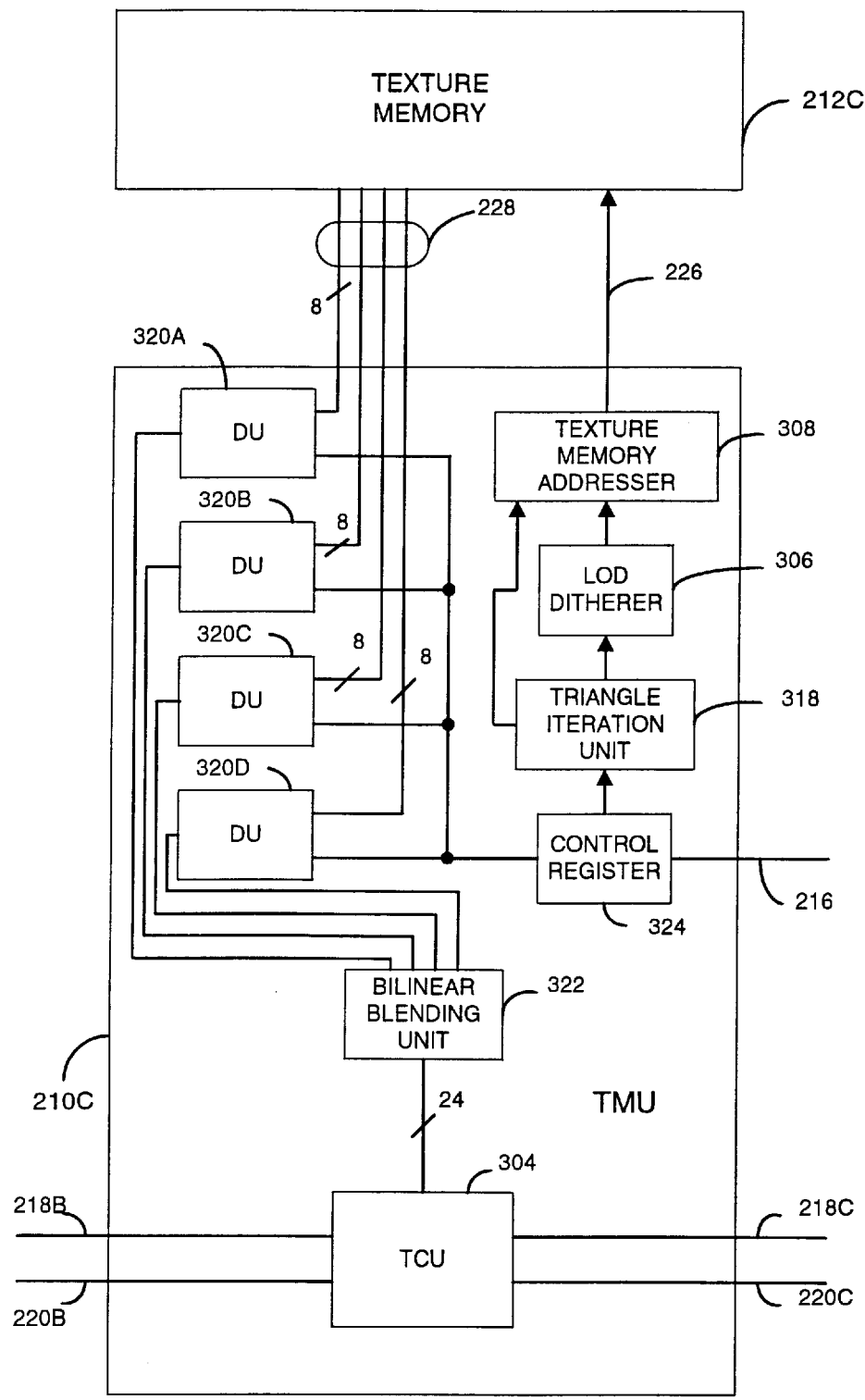
FIG. 3 is an illustration of a texture mapping unit and texture memory according to the preferred embodiment of the present invention.

FIG. 3 is an illustration of a TMU 210 and a texture memory unit 212 of the present invention. Each TMU 210 includes a control register 324, a triangle iteration unit 318, a level of detail (LOD) ditherer 306, a texture memory addresser 308, four decompression units (DU) 320, a bilinear blending unit 322, and a texture composite unit (TCU) 304. The TMU 210 and the LOD ditherer 306 are described in greater detail in co-pending patent application entitled *LOD Dithering Apparatus and Method*, referenced above. The TCU 304 is described in greater detail in co-pending application entitled *Texture Composition Apparatus and Method*, referenced above. The triangle iteration unit 318 is initialized and synchronized with other triangle iteration units located in other TMU's 210A, 210B, and in the Frame Buffer Interface 204 by a control signal received on control line 216 and stored in the control register 324. Once initialized and synchronized, the triangle iteration unit 318 renders objects using a shape, e.g., a triangle, in a predetermined manner. The triangle iteration unit 318 iterates through each pixel in an object and sends the pixel coordinates and the LOD value to the LOD ditherer. The LOD Ditherer 306 receives the pixel coordinates for each pixel from a triangle iteration unit 318. For each pixel, the LOD ditherer 306 determines the mipmap from which the pixel value is generated and outputs the mipmap level to the texture memory addresser 308. For each pixel, the texture memory addresser 308 outputs the mipmap address to the texture memory 212C via address signal line 226. Based upon the mipmap address, the texture memory outputs four texture signals to the TMU 210 representing the values of four texels, in the determined mipmap. These four texel values are used to determine the pixel value, as described below. In the preferred embodiment, each DU 320 receives an 8-bit signal representing the value of one texel from the determined mipmap. Each decompression unit generates a 24-bit red-green-blue (RGB) color signal from the received 8-bit signal. The decompressed RGB signal generated by each DU 320 represents the value of one of the four texels. The four texel values are combined in a bilinear blending unit 322 and a single 24 bit RGB signal is output from the bilinear blending unit 322 representing the value of a pixel.

Before decompressing the texel values, the texel values are compressed. In the preferred embodiment, the texel values are compressed off-line, i.e., all texel image compression occurs before decompressing any texels or determining the value of any pixels. One reason for this is that the decompression technique is dynamic in that each pixel can be represented by any of a large number of combinations of texel values based upon, for example, texel pitch, the LOD value, and pixel position relative to the texel map. Accordingly, the compression process reduces the texture memory 212 size requirements and the decompression logic in the DU 320 by compressing the data in a manner that optimizes the texel representation size in relation to the texel representation quality after decompression. In addition, all decompression multiplication operations are performed during the compression phase. The compression techniques of the preferred embodiment will now be described and then the decompression technique and the decompression hardware will be described.

Figure 4:
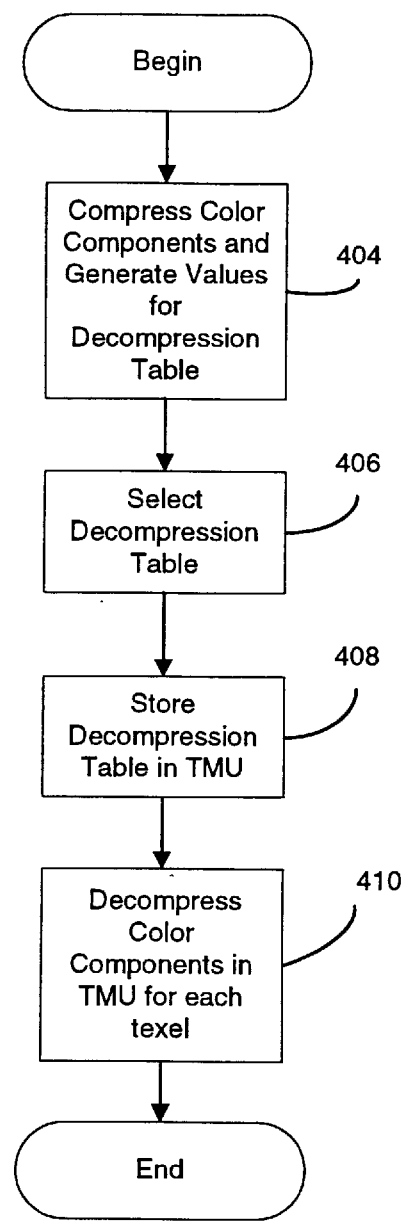
FIG. 4 is a flow chart of the operation of the method of the preferred embodiment of the present invention.

FIG. 4 is a flow chart of the operation of the preferred embodiment of the present invention. The compression module 122 compresses 404 the color components and generates values for the decompression table. As described above, this process is performed for all texel images. After all texel images have been compressed and the computer 100 is operating an application program, the graphics engine 114 begins the decompression process by selecting 406 a decompression table generated by the compression module 122. One or more decompression tables are stored 408 in the DU 320 and the DU 320 decompresses 410 the texels to determine pixel values that are displayed on the monitor 112. The process of compressing 404 the color components and generating values for the decompression table is now set forth.

As described above, in conventional systems texels are represented using RGB color channels. However the present invention uses a YAB color space. Each texel is represented by 8-bits in the YAB color space, e.g., 4 bits for the Y-channel, and 2-bits each for of the A-channel and the B-channel. In addition, the 8-bits do not represent the channel values directly. Instead, the channel bits index a channel palette. For example, the Y-channel has a 16 entry palette that is indexed by the 4-bits of the Y-channel texel representation, the A-channel and the B-channel have a four entry palette that are each indexed by the 2-bit A-channel and B-channel texel representation. The use of a YAB color space achieves data compression using fewer bits per texel, like the RGB332, while providing a high quality image comparable to the palettized textures. However, since the size of the palettes are significantly smaller when compared to the 256-color palettized texture, expensive hardware implementation is avoided and palette downloading is significantly faster. For example, more texel maps can be stored in the texture memory 212 using the present invention when compared to storing texture maps having a 256-color palette.

One example of the YAB color space is a YIQ color space. Some distinctions between the YIQ color space and the traditional RGB color space are now set forth. The traditional RGB color space used in computer graphics has redundant information in each of the red, green, and blue channels. There are alternate color spaces, such as the YIQ color space, that provide image quality that is as good as the quality of images produced using the RGB color space while reducing the amount of data required to represent the image. While the RGB space evolved as a matter of representational and manufacturing convenience, the YIQ space is more finely tuned to the human visual system. For example, the human eye is more sensitive to abrupt transitions in brightness than in hue. In addition, the eye is more sensitive to the transitions in the orange-blue range, where the flesh tones line, than in the purple-green range. Hence, the YIQ color space is defined such that the Y axis aligns with the brightness component of a picture, while the I and Q axes are aligned with respect to the orange-blue and purple-green axes in the RGB space. The transformation from RGB and YIQ color space is accomplished by a linear matrix transformation shown in equation (1) where (R) represents the value of the red color component, (G) represents the value of the green color component, (B) represents the value of the blue color component, and Y, I, and Q represent the values in the Y, I, and Q color components respectively.

$$Y = 0.299(R) + 0.587(G) + 0.114(B)$$
$$I = 0.596(R) - 0.275(G) - 0.321(B)$$
$$Q = 0.212(R) - 0.523(G) + 0.311(B)$$

Equation (1)

If an RGB image is converted to the YIQ color space using equation (1), it is possible to achieve compression by quantizing the Y, I, and Q space more coarsely than the RGB space without degrading the quality of the image substantially, e.g., by allocating fewer bits to represent each of the Y, I and Q channels. In addition, instead of allocating an approximately equal number of bits to each of the color channels, as is done in the RGB332 compression, the present invention allocates more bits to color channels that the human eye is more sensitive to, and fewer bits to the remaining color channels. For example, when an image is represented in the YIQ color space at high resolution, the preferred embodiment of the present invention allocates 16 distinct values for the Y-channel, that carries the intensity variations of the image, and 4 distinct values for each of the I and Q channels, that carry the hue information, without reducing the quality of the image. Hence an uncompressed 16 or 24 bit RGB image can be represented in the YIQ space, using the present invention, with only 8 bits of information. The Y-channel is represented by 4 bits, to identify one of the 16 quantized Y values, and the I-channel and the Q-channel are each represented by 2 bits, to identify one of the 4 quantized I or Q values.

The YIQ color space is one example of a YAB color space. Equation (1) shows how each value in the RGB color space is converted to the YIQ color space. However, alternate coefficients can be used to determine the transformation of RGB values to another YAB color space. That is, instead of using the I and Q axes in the YIQ color space, two other axes can be used. A benefit of using a YAB color space that is different from the YIQ color space is that the distribution of colors in the texture image may be more accurately modeled in this different color space. While the distribution of colors in many photographs lie along the I axis and Q axis, many textures, as represented in computer graphics, e.g., sky backgrounds, terrain, and building facades, frequently have color distributions that are concentrated along axes that are different from the I axis and the Q axis. If two other axes are chosen to best match the color distribution in a particular image, then a decompression table can be constructed using these axes that more closely match the texture image when compared to decompression tables constructed using the YIQ color space. This indicates that the decompression table implementation can represent different textures more accurately than if it were limited to the YIQ color space, RGB color space, or any other single color space. Some techniques for selecting the color space and generating decompression tables are described below.

For ease of discussion, the YAB color space that is to be selected using the first color space selection technique is limited to those color spaces that have the following characteristics: (1) the color space has 3 color channels, identified as Y, A, and B; (2) the first color channel of the YAB color space is an intensity channel, Y; and (3) the YAB color space is a linear transformation of the RGB color space. These three characteristics are not color space requirements, i.e., the present invention will operate on color spaces that do not satisfy one or more of these characteristics. However these characteristics will simplify the mathematical conversions that are used to convert the RGB image to a YAB image. When selecting a color space using a second technique described below, that is by converting the color space and determining the decompression values for a decompression table using a neural network algorithm, the selected color space need not satisfy any of the above three characteristics.

Figure 5:
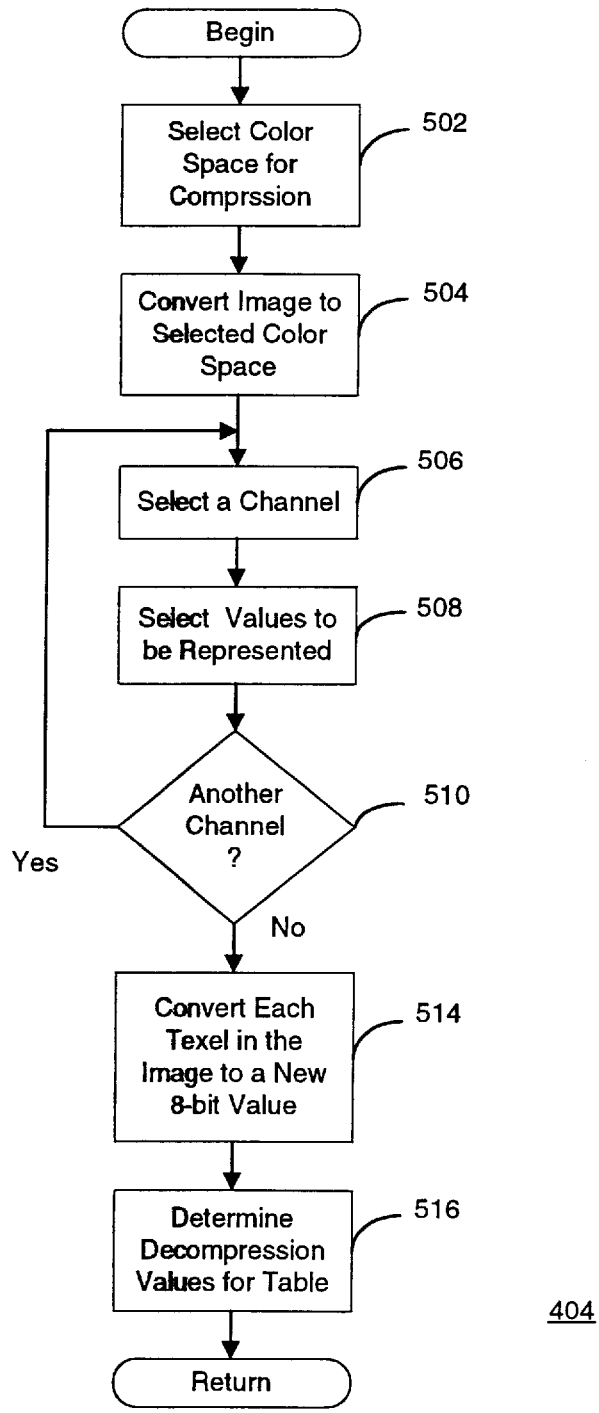
FIG. 5 is a flow chart of the technique for compressing color components and generating values of a decompression table.

FIG. 5 is a flow chart of the technique for compressing 404 color components and generating values of a decompression table. With reference to FIG. 5, a YAB color space is selected 502. The YAB color space can be equal to the YIQ color space, a YUV color space, or a different color space as long as the Y color channel represents the intensity of the texel. The A and B color channels can be manually selected based upon an inspection of the image, a trial-and-error approach can also be used, or the neural net technique of the present invention can be used to select the A and B color channels. The description of this neural network technique is set forth below following the description of a first technique for selecting a color space.

When selecting 502 a color space using a first technique, the texel image is converted to a color space where the Y color channel represents the intensity value and the other two color channels, A and B, are selected such that they have a narrow distribution of values. For example, if a histogram is generated of the color values of the texel image in the selected YAB color space, the histogram should have a high concentration (frequency) of color values along the selected A and B color axes, i.e., the histogram should be "spiky" along the selected A and B color axes. As noted above, for ease of discussion, the YIQ color space is selected 502.

The compression module 122 then converts 504 the input RGB colors to the YAB, YIQ, format. The RGB input colors are typically a palette of colors or 24-bit colors received by, for example, a photographic scan. Since, in this example, the YIQ color space is selected, the conversion 504 is accomplished using equation (1). In the preferred embodiment, this conversion 504 is performed with high precision and retains 8-bits of precision in all three axes, Y, I, and Q. After selecting the color space, the compression module 122 selects 506 a color channel and determines 508 the values that are to be represented for the selected color channel. To determine 508 the values that are to be represented in the selected color channel, the compression module 122 or a user can create a histogram of the distribution of the image values in the three axes. The compression module 122 or a user selects sixteen representative values for the Y axis, and four values for each of the A and B (I and Q) axis. The number of selected values for each color channel is based upon the number of bits that will represent each of the color channels when compressed. In the preferred embodiment each texel is represented as a YAB422 value. That is, the Y-channel will be represented by 4-bits, the A-channel and the B-channel will each be represented by 2-bits. Hence the Y-channel can represent sixteen values ($2^4$) and the A and B-channels can each represent four values ($2^2$).

A first representative value selection technique 508 is to automatically or manually select values that are equally spaced throughout the possible values of each color space. For example, if the values in the Y color space range from 0 to 255 and there are sixteen representative values that are selected, then the representative values can be: 0, 17, 34, 51, 68, 85, 102, 119, 136, 153, 170, 187, 204, 221, 238, and 255. However, because the color space is selected such that the image has a spiky histogram in the A and B color channels, e.g., the I and Q color channels, the present invention selects values that do not encompass all of the possible values of each channel. Instead the selected representative values are tuned to the specific color space. A second technique for selecting representative values determines the values in each color space between which 98% of the histogram values of the texture image lie. For example, the top one percent and the bottom one percent of the histogram values are discarded and the representative values are chosen to represent only the remaining 98% of the values. A higher percentage or lower percentage of values can alternately be used. If a higher percentage of values are represented, then the sixteen representative values may be spaced too far apart and a grainy appearance can result when the values are decompressed. If a lower percentage of values are represented, then the dynamic range of the image is reduced and a muted image may result. However, it may be advantageous to alter the percentage in some situations. In the present example the 98% range is used. If 98% of the values of the Y color channel histogram are between 20 and 193 then the selected representative values can be: 20, 32, 43, 55, 66, 78, 89, 101, 112, 124, 135, 147, 158, 170, 181, and 193. The difference between these representative values is less than or equal to 13, in the first example, the difference was 17. Typically, a larger difference between representative values results in a lower resolution in the image representation.

The compression module 122 can select 508 the representative values of the A-channel and the B-channel using similar techniques. If 98% of the histogram values of the image in the A-channel are between −27 and 28 then the four representative values for the A color channel can be: −27, −8, 9, and 28. Similarly, if 98% of the histogram values of the image in the B-channel are between −10 and 4 then the four representative values for the B color channel can be: −10, −5, 0, and 4. Although the representative values selected above are evenly spaced, the spacing between the representative values can vary, e.g., if the histogram of the image in one or more color channels has a spike, more representative values can be selected near the center of the spike in order to more accurately represent these values. FIGS. 6A, 6B, and 6C illustrate the representative values of the Y, A, and B color channel for the above example.

After selecting the representative values for each color channel in the texture image 510, each texel in the uncompressed texel image is converted 514 to an 8-bit value. As described above, each texel in the texel image is represented by 24-bits, 8-bits representing each of the three channels, i.e., RGB. Each texel is converted from a 24-bit RGB representation to a 24-bit YAB representation using equation (1), if the selected color space is YIQ. If a color space other than YIQ was selected in step 502, then different coefficients would be used in equation (1), as described above. In the present example, equation (1) is used to convert each (r,g,b) texel value of the image to a (y,i,q) texel value. For each YIQ color channel, the compression module 122 determines the closest representative value, defined in step 508, and combines the index value associated with the closest representative value for each of the three color channels to generate 514 the 8-bit representation. The 8-bit representation is in the form $Y_3Y_2Y_1Y_0A_1A_0B_1B_0$. For example, if the RGB value of a texel is (72.3, 80.8, 96.3) the compression module 122 converts the value of the texel in the YIQ color space is equal to approximately (80, −10, 3), using equation (1). The Y value, 80, is closest to the Y representative value of 78, that is associated with the Y index 0101 ($Y_3Y_2Y_1Y$ ), as shown in FIG. 6. The A value, −10 that is closest to the A representative value of −8, that is associated with the A index 01 ($A_1A_0$). The B value, 3, is closest to the B representative value of 4, that is associated with the B index 11 ($B_1B_0$). Accordingly, the 8-bit compression value for this texel is 01010111.

As described above, the 8-bit compressed representation of a texel does not directly represent either the RGB representation of the texel or the YAB representation of the texel. Instead, the 8-bits represent an index to a decompression table. A goal of the compression/decompression process is to generate a RGB value that is substantially equal to the RGB value of the texel in the uncompressed texel image. Accordingly, a feature of the present invention is that the RGB equivalent of each YIQ representative value is stored in the decompression table. The construction 516 of the decompression table is now described.

As described above, a goal of the decompression process is to generate a RGB value for a texel. However, the present invention uses a different color space when compressing each image because it is typically more efficient, as described above. In order to convert a YAB texel value back to a RGB texel value the inverse of equation (1) must be used. That is, if the coefficients of equation (1) are a 3×3 matrix, the coefficients used to convert a texel from a YAB representation to a RGB representation are the coefficients of the inverse matrix. Accordingly, for the YIQ color space conversion given in equation (1), the inverse is given in equation (2).

$$R = 1.0 *(Y) + 0.95 * (I) + 0.62 * (Q)$$
$$G = 1.0 *(Y) - 0.28 * (I) - 0.64 * (Q)$$
$$B = 1.0 *(Y) - 1.11 * (I) + 1.73 * (Q)$$
Equation (2)

In order to prevent the decompression unit from having expensive multiplication logic, the present invention performs the YAB to RGB conversion during the compression process by storing multiplication results for each of the representative Y values, representative A values, and representative B values in the decompression table. As seen in equation (2), the representative Y value is only multiplied by the coefficient 1.0, accordingly the Y portion of the decompression table includes the sixteen representative Y values. The representative A values, e.g., the I values in this example, can be multiplied by one of three coefficients depending upon whether the red, green, or blue color channel is being converted. Accordingly, each of the four representative A values, e.g., $-27$, $-8$, 9, and 28, is multiplied by: (0.95), ($-0.28$), and ($-1.11$) representing the I-channel contribution to the red channel, green channel, and blue channel, for each representative value. The twelve resulting values are stored as the A portion of the decompression table. The representative B values, e.g., Q values in this example, can be multiplied by one of three coefficients depending upon whether the red, green, or blue color channel is being converted. Accordingly, each of the four representative B values, e.g., $-10$, $-5$, 0, and 4, is multiplied by: (0.62), ($-0.64$), and (1.73), representing the Q-channel contribution to the red channel, green channel, and blue channel, for each representative value. The twelve resulting values are stored as the B portion of the decompression table. The values by which each of the representative values are multiplied is dependent upon the color space that is selected.

Since the Y-channel representative values are all positive values, the Y portion of the decompression table does not include any negative values. Therefore, the Y-channel values in the decompression table can be stored as 8-bit values, i.e., no extra sign bit is necessary. The A portion and the B portion of the decompression table can include negative values. Therefore, the preferred embodiment of the present invention stores these as a 9-bit signed value. The most significant bit is the sign bit and the remaining 8-bits are stored in a two's-complement format. It will be apparent to persons skilled in the art that other techniques for storing the data can be used without departing from the teachings and scope of the present invention.

The values stored in the decompression table for the example given above are equal to the values shown in FIG. 7. The first four decompression table addresses in FIG. 7 correspond to the Y portion of the table. Each value is represented in hexadecimal (Hex) format. For example, the first value of the Y portion is equal to the representative value associated with the index 0000. This representative value is 20. Therefore, the least significant byte of decompression table address 0 is equal to 14 (Hex). The most significant byte of decompression table address 3 is equal to c1 (Hex). This is equal to the representative value associated with the index 1111, i.e., 193. As described above, the values stored in the A portion and the B portion of the decompression table are in a signed 9-bit value. Beginning at decompression table address 4, the representative value associated with the A index 00 is $-27$. This value is multiplied by three different values (0.95, $-0.28$, and $-1.11$) and the result of each of these multiplications is stored in the A portion of the decompression table. The three values that are associated with the A index 00 are $-25$, 9, and 29. These three values are stored in decompression table address 4 as "079c0e1d" (Hex). The representative values associated with the remaining A indices are similarly multiplied and stored. The values stored in the A portion of the decompression table are shown in FIG. 6B at decompression table address 4 through 7 with only 27 bits stored per decompression table address. Similarly, beginning at decompression table address 8, the representative value associated with the B index 00 is $-10$. This value is multiplied by three different values (0.62, $-0.64$, and 1.73) and the result of each is stored in the B portion of the decompression table. The three values stored for the B index 00 are $-6$, 6, and $-17$. The representative values associated with the remaining B indices are similarly multiplied and stored. The values stored in the B portion of the decompression table are shown in FIG. 6B at decompression table addresses 8 through 11 with 27 bits stored per decompression table address.

An second technique for selecting 502 the color space and selecting 508 the values to be represented for each color channel of the color space according to the preferred embodiment of the present invention is now set forth.

Figure 8:
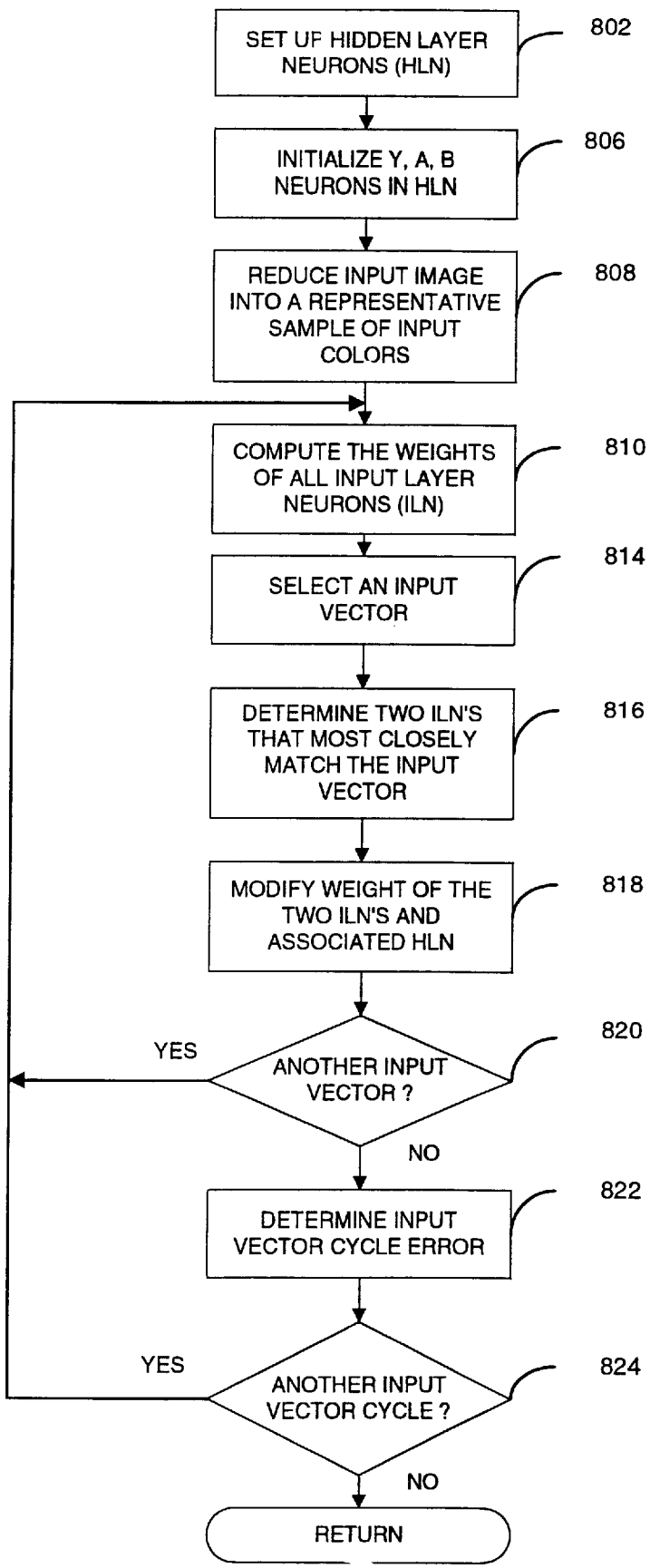
FIG. 8 is a flowchart of the YAB color space selection process using the color space neural network technique of the preferred embodiment of the present invention.
Figure 9:
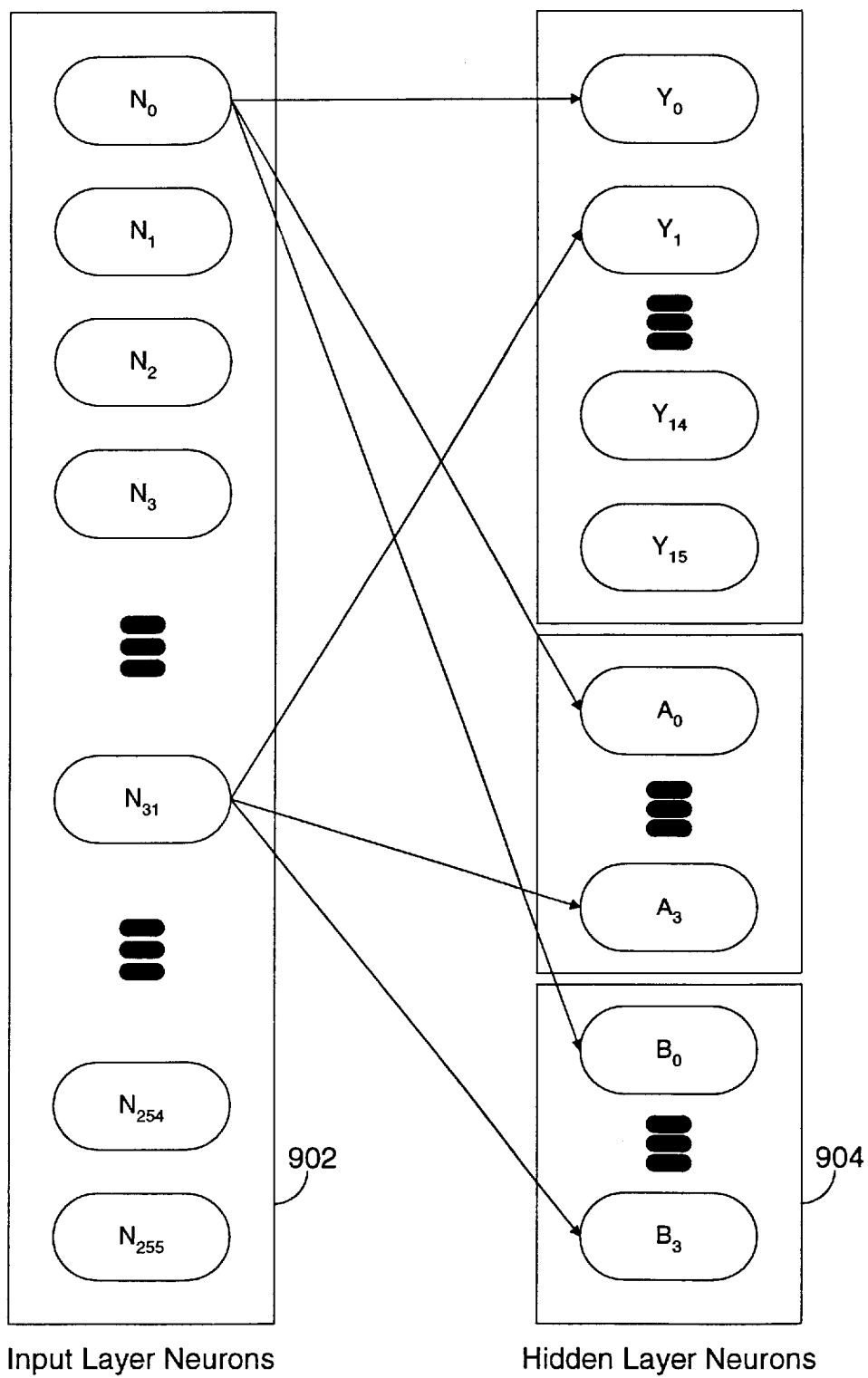
FIG. 9 is a representation of input layer neurons and hidden layer neurons in a neural network.

FIG. 8 is a flowchart of the YAB color space selection process using the neural network technique of the preferred embodiment of the present invention. FIG. 9 is a representation of a neural network of the preferred embodiment of the present invention. The present invention performs optimal color quantization using a modified form of a Kohonen neural network. A description of Kohonen Neural Networks is provided in Dekker, *A* 1993 *Optimal Colour quantization Using Kohonen Neural Networks*, Technical Report, Dept. of Information Systems and Computer Science, National University of Singapore (October 1993), that is incorporated by reference herein in its entirety. A brief description of Kohonen neural networks is set forth below and then an a description of a Kohonen neural network as used by the preferred embodiment of the present invention is provided.

A Kohonen neural network is a collection of isolated neurons each having an associated weight. While the neurons in the network are not explicitly connected together, they are implicitly arranged in a topology. Thus, each neuron has some number of nearest neighbors associated with it because of its position in the collection of neurons. Typically, the neurons are either arranged in 1, 2 or 3 dimensions, resulting in a string, mesh or lattice of neurons. However, based upon the application, any arbitrary connectivity arrangement can be chosen. It is convenient to think of the inputs as input vectors that are arranged in some spatial dimension, e.g., linearly, spatially, or volumetrically. A function of the Kohonen network is to attempt to map the input topological space into the topological space of the neural network. Thus, the network is capable of optimally mapping input volumes to output lines, planes, or volumes, or in whatever topology the network is constructed. In the present example, the neural network will map an input texel image to a YAB color space that optimally represents the texel image.

A feature of a Kohonen network is that it is a competitive learning network. This competition works as follows. First, a sample input is presented to all neurons in the network simultaneously. There is typically one neuron in the network that matches the input most closely, and this neuron is deemed the "winner." The output of the network is the output of this winning neuron. This winning neuron modifies it's weights to more closely match the input in order to more accurately represent the input on subsequent presentations of the same input. In some embodiments, the neurons that "lose" the competition do not modify their weights. When presented repeatedly with a sequence of inputs, the Kohonen network eventually tunes itself so that it "fires" a single neuron that most closely represents the input value. Different neurons in the network fire for different inputs, and if the number of neurons is much less than the sample inputs presented to the network, the Kohonen network behaves as a quantizer that succinctly categorizes a large pool of inputs into a small set of representative values.

There are some problems that can occur when implementing a Kohonen network. For example, implementing a Kohonen network can result in many neurons in the network representing the most frequent, or most closely clustered, input values, thereby resulting in few or no neurons representing the distributed colors in the input texel image. A result of having few or no neurons representing the distributed colors in the input texel image is a reduction in resolution and image quality. Another problem associated with implementing a Kohonen network is that when using a Kohonen network to map an input topological space and an output topological space, the mapping is twisted or warped, as described below. Preferably, inputs vectors having similar values should map to neurons that are in some close connectivity neighborhood of the neural network. However, in conventional Kohonen networks, two closely related input vectors can map to neurons that are not very close together spatially in the network. As a result, the topological space of the neural network starts to "warp", and there will be no obvious correlation between the arrangements of input vectors and the weights of neighboring neurons. To avoid this problem, the Kohonen network of the present invention uses a learning operation. A conventional Kohonen network modifies the weight of the neuron most closely associated with the input vector. However, as described below, the present invention modifies the weight of at least two neurons. Modifying multiple neurons provides the neural network with a certain "elasticity" that increases the likelihood that neurons in a neural network neighborhood will be mapped into a neighborhood of input vectors. When a winning neuron alters its weights, it drags along one or more of its nearest neighbors as well, as if the neighbors were elastically connected to it in some way. Over a period of training, the radius of the neighborhood around a winning neuron is gradually shrunk, because the probability of a winning neuron arising in some other unrelated part of the neural network falls, and the topological space of the neural network is less likely to get warped.

The specific implementation of the Kohonen neural network of the preferred embodiment of the present invention will now be described with reference to FIGS. 8–9. The Kohonen neural network of the preferred embodiment consists of 2 layers of neurons, a hidden layer 904 and an input layer 902. The hidden layer of neurons 904 are set up 802 and include 3 sets of neurons that resemble the structure of the YAB decompression tables described above. Each Y neuron, $Y_0 \ldots Y_{15}$, is associated with a single floating point weight, which ranges from 0 to 255. Each of the four A neurons, $A_0 \ldots A_3$, is associated with 3 floating point weights "r", "g", and "b" whose dynamic range is a floating point number in the range −256 to 255. Similarly, each of the four B neurons, $B_0 \ldots B_3$, is associated with 3 floating point weights "r", "g", and "b" whose dynamic range is a floating point number in the range −256 to 255. The weights of the A neurons and B neurons are initialized 806 to 0.0, and the weight of each Y neuron is initialized to a value increasing in uniform steps from 0 for $Y_0$ to 255 for $Y_{15}$.

The input layer is a set of 256 neurons, $N_0 \ldots N_{255}$, with each neuron representing one of the possible 256 indices of the YAB 422 color space index. Each input neuron has 3 integer weights associated with it, representing r, g and b values having the integer range 0 ... 255. In addition, each input neuron is connected to exactly one Y, A, and B neuron. The input neuron having index i, $N_i$, is represented in 8-bit binary notation as $b_7b_6b_5b_4b_3b_2b_1b_0$ and is associated with the hidden layer Y neuron having the binary index $b_7b_6b_5b_4$. The A neuron that is associated with $N_i$ has the binary index $b_3b_2$, while the B neuron that is associated with $N_i$ has the binary index $b_1b_0$. The weight of each neuron in the input layer is not initialized. Instead, the weights are dynamically computed based upon the associated Y, A, and B neurons.

The compression module 122 reduces 808 the input image into a representative sample of input colors. The input image is, preferably, an RGB image having 8-bits per image component, e.g., per texel. Although the input image texels can be used directly on the neural network, the present invention utilizes this smaller representative sample for two reasons. First, the fewer inputs vectors, the faster the network simulation proceeds. Second, the spatial distribution of the input samples in RGB space provides a better sample than many iterations of similar input samples when using the neural network technique of the preferred embodiment because if many iterations of similar input samples are used, the neural network may cause many neurons to be captured by a small cluster of inputs.

One technique for reducing 808 the input image into a representative sample of input colors is accomplished by determining if the input image is constructed with a small palette of colors, for example, when the number of colors in the palette is less than approximately $2^{15}$ colors. If the number of colors in the palette is small, then the palette can be used as the representative sample of input colors. If the input image is not constructed from a small palette of colors, then the compression module 122 constructs a palettized image by replacing each color with an index having the 5 most significant bits (MSBs) of the red, green, and blue color channels. This technique ensures that the constructed palette is limited to $2^{15}$ colors. Typically, the number of input colors is approximately 4000 or $2^{12}$. In an alternate embodiment, all of the colors of the input image can be used as input colors, even if the number of colors exceed $2^{15}$. The use of a large number of input colors increases the number of input vectors that are input into the neural network for each input vector cycle, described below.

The compression module 122 computes 810 the weights of all the input layer neurons. As described above, each input layer neuron is associated with three weights that are identified as r, g, and b. For example, input layer neuron $N_i$, is associated with three weights $r_i$, $g_i$, and $b_i$. The value of $r_i$ is determined by summing the value of its associated Y neuron and the red components of its associated A and B neurons. The value of $g_i$ is determined by summing the value of its associated Y neuron and the green components of its associated A and B neurons. Similarly, the value of $b_i$ is determined by summing the value of its associated Y neuron and the blue components of its associated A and B neurons. The weights $r_i$, $g_i$, and $b_i$ are clamped to an integer value between 0 and 255. As an example, the weights associated with input layer neuron $N_{31}$ are now determined. The 8-bit binary value of the index 31 is equal to 00011111. This value corresponds to $b_7b_6b_5b_4b_3b_2b_1b_0$. Accordingly, the Y neuron associated with $N_{31}$ is $Y_1$, the A neuron associated with $N_{31}$ is $A_3$, and the B neuron associated with $N_{31}$ is $B_3$. The weight $r_{31}$ associated with input layer neuron $N_{31}$ is equal to the value of $Y_1$, that is initially 15, plus the value of the red components of the $A_3$ and $B_3$ neurons. These red components are both equal to zero for the first iteration. Accordingly, the r, g, and b weights of neuron $N_{31}$ are all equal to 15.

The compression module 122 then randomly selects 814 an input vector and determines the two input layer neurons that most closely match the RGB values of the input vector. The input vector is selected randomly to reduce the chance that the neural network will be influenced too heavily by a sequence of closely related input vectors. If two input layer neurons are equally matched, the preferred embodiment uses a convention of selecting the input layer neuron having a lower index. There are many techniques that can be used to quantify the best match between the RGB values of the input vector and the input layer neuron weight. One technique determines the Euclidean distance between the RGB values of the input vector, i.e., $(r_i, g_i, b_i)$, and the RGB weights of each input layer neuron $(N_{ir}, N_{ig}, N_{ib})$. The Euclidean distance is equal to: $(r_i-N_{ir})^2+(g_i-N_{ig})^2+(b_i-N_{ib})^2$. A first input layer neuron (ILN1) and a second input layer neuron (ILN2) having the smallest Euclidean distance are selected.

Another technique for determining the two input layer neurons that most closely match the RGB values of the input vector is to compute $|r_i-N_{ir}|$, $|g_i-N_{ig}|$, $|b_i-N_{ib}|$, and then compute a distance measure by generating a 24-bit error value interleaving the green, red and blue error values bit-wise. For example, if the green error component, red error component, and blue error component are identified as $e_g$, $e_r$, and $e_b$, respectively, and each error component is 8-bits in length, then the 24 bit error value is equal to $e_{g7}e_{r7}e_{b7}\ldots e_{g0}e_{r0}e_{b0}$. This has the effect of ensuring that large errors in one component are not accepted easily, even if the errors in the other two components are very small. The distance measure is computed between the input vector and every single input layer neuron, and the two neurons having the least distance to the input vector, ILN1 and ILN2, are selected.

After ILN1 and ILN2 are selected, the compression module 122 modifies 818 the weights of these input layer neurons by modifying the weights of the Y neuron, A neuron, and B neuron associated with these two input layer neurons. For the most closely matched input layer neuron, ILN1, the compression module 122 determines three error values, $e_r$, $e_g$, $e_b$, that are floating point values representing the difference in the red, green, and blue components of the input vector and the ILN1. In the preferred embodiment, these error values are calculated in accordance with equation (3) where x is equal to the index of ILN1 and a is called the "learning rate" and is equal 0.5.

$$e_r = \alpha * (r_i - N_{xr})$$
$$e_g = \alpha * (g_i - N_{xg})$$
$$e_b = \alpha * (b_i - N_{xb})$$

Equation (3)

The weight of the Y neuron associated with ILN1 is modified in accordance with equation (4).

$$Y_x = Y_x + 0.25 * (e_r + e_g + e_b)$$

Equation (4)

As described above, the A neuron and B neuron associated with ILN1 each have three associated weights, $A_{xr}$, $A_{xg}$, $A_{xb}$, $B_{xr}$, $B_{xg}$, $B_{xb}$. These weights are modified in accordance with equation (5)

$$A_{xr} = A_{xr} + 0.25 * e_r$$
$$A_{xg} = A_{xg} + 0.25 * e_g$$
$$A_{xb} = A_{xb} + 0.25 * e_b$$
$$B_{xr} = A_{xr} + 0.25 * e_r$$
$$B_{xg} = A_{xg} + 0.25 * e_g$$
$$B_{xb} = A_{xb} + 0.25 * e_b$$

Equation (5)

The net effect of modifying the three neurons associated with ILN1, i.e., $Y_x$, $A_x$ and $B_x$ is to modify ILNI in the direction of the RGB value input vector, by distributing 0.25 of the error to each of the contributing neurons $Y_x$, $A_x$ and $B_x$. The weight of the neurons associated with ILN1 are clamped to ensure that they do not exceed the predefined range. Specifically, $Y_x$ is clamped between 0 and 255. $A_x$ and $B_x$ are clamped between −256 and 255.

The second-best matching neuron, ILN2 is modified similarly to ILN1. The index of ILN2 is equal to "x" and the weights associated with the neurons associated with ILN2 are modified in accordance with equations (2)–(4) with α being set to a value less than the value of α used for ILN1, e.g., α=0.25. Modifying two neurons provides the neural network with some "elasticity", as described above.

Since some of the Y neurons, A neurons, and B neurons may have been modified, the weights of some of the input layer neurons may have been changed. Accordingly, if at least one input vector has not yet been selected 820, then steps 810, 814, 816, 818 and 820 are repeated until all of the input vectors have been selected, i.e., until one input vector cycle is complete.

After a single input vector cycle is complete, an error value for the neural network is determined 822. The error value can be based on many different parameters, e.g., the maximum error between the input vectors and their best matching neuron weights. After the error value has been determined, the input vector cycle repeats, i.e., steps 810, 814, 816, 818, and 820 are repeated until 824 either: a predetermined number of input cycles have occurred; the neural network error value is equal to zero; or the neural network error value stabilizes, for example. The determined neural network error value is typically high in the initial input vector cycles, but decreases in latter input vector cycles. If the error value is zero, then the neural network has converged to a set of YAB values that exactly represents the input image. As described above, if the maximum error settles down to a stable value, then no additional input vector cycles are performed. One example of a stable error value is when the maximum error value does not decrease after a large number of input vector cycles, e.g., after 10,000 input vector cycles. After a stable value is found, the process is complete and the selected color space is equal to the values of the Y neurons, A neurons, and B neurons represent an optimal color space for the image.

The values of the Y neurons represent the Y portion of the decompression table. That is, the values of the sixteen Y neurons are stored 516 in decompression table addresses 0–3, with reference to FIG. 7. Similarly, the r, g, and b values of the four A neurons are stored in the A portion of the decompression table, e.g., decompression table addresses 4–7, and the r, g, and b values of the four B neurons are stored in the B portion of the decompression table, e.g., decompression table addresses 8–11.

When the neural network technique is used to determine the color space, the compression module 122 converts 514 each texel in the texture image to an 8-bit value by determining the input layer neuron that most closely matches the texel. The 8-bit texel value is set equal to the 8-bit index of this input layer neuron. As described above, the values stored in the decompression table representing the A neurons and the B neurons are in already in the RGB format so the values in the decompression table are equal to the weights associated with the hidden layer neurons, that is, no additional color space conversion is required.

After each texture image is compressed 404 and the decompression table (YAB table) is generated, the decompression table is stored in RAM 122 until an application program operating on the computer 100 requests the texture image. When the texture image is requested by the application program, the decompression table is selected 406 from RAM 104 and is stored 408 in the DU 320 and the texel values of the texture image, i.e., the indices to the decompression table, are stored in the texture memory 212. In the preferred embodiment, each DU 320 includes two decompression tables corresponding to two different texture images. A benefit of the present invention is textures utilizing different palettes can be switched quickly because of the small size of the decompression table and because each texel is represented by only 8-bits. In comparison to conventional palette systems that have a palette table of 768 bytes (6144 bits), as described above, the decompression table of the present invention is only 384 bits (32×12 bits), as shown in FIG. 7. However, of these 384 bits, only 344 bits are necessary, 128 bits for the Y portion of the decompression table and 108 bits for each of the A portion and the B portion of the decompression table. In addition, each texel is represented by only 8-bits. Accordingly, the present invention switches between texel images using different palettes faster than conventional systems.

As described above, in the preferred embodiment the value of each pixel is determined by combining four texels using a bilinear filtering operation, it will be apparent to persons skilled in the art that a variety of filtering techniques can be used to determine the pixel value and, accordingly, a different number of texel values can be used to determine each pixel value. The bilinear filtering operation is performed in the bilinear blending unit 322. The in greater detail in co-pend is described in greater detail in co-pending U.S. patent application entitled *System and Method for Level of Detail Dithering*, referenced above.

As described above, a pixel is selected by the triangle iteration unit 318, and the LOD ditherer 306 determines the texel image mipmap from which each of the four texels is selected. The texture memory addresser 308 determines the texture memory address for each of the four texels and transmits the address to the texture memory 212 via address signal line 226. The four texel values are sent from the texture memory 212 to the TMU 210 via four local texture signals on four local texture signal lines 228. Each local texture signal represents 8-bits. The 8-bits correspond to the 8-bit compression value associated with one of the four selected texels, e.g., $B_7B_6B_5B_4B_3B_2B_1B_0$. The technique for generating the compression value is set forth above. The four MSBs of the 8-bit compression value, $B_7B_6B_5B_4$, correspond to a Y-channel index to the decompression table. The next two MSBs, $B_3B_2$, correspond to a A-channel index to the decompression table. Similarly, the two least significant bits, $B_1B_0$, correspond to the B-channel index to the decompression table. Each of the four 8-bit compression values is sent to a DU 320. The operation of the DU 320 is described in greater detail below with reference to FIGS. 10 and 11.

Figure 10:
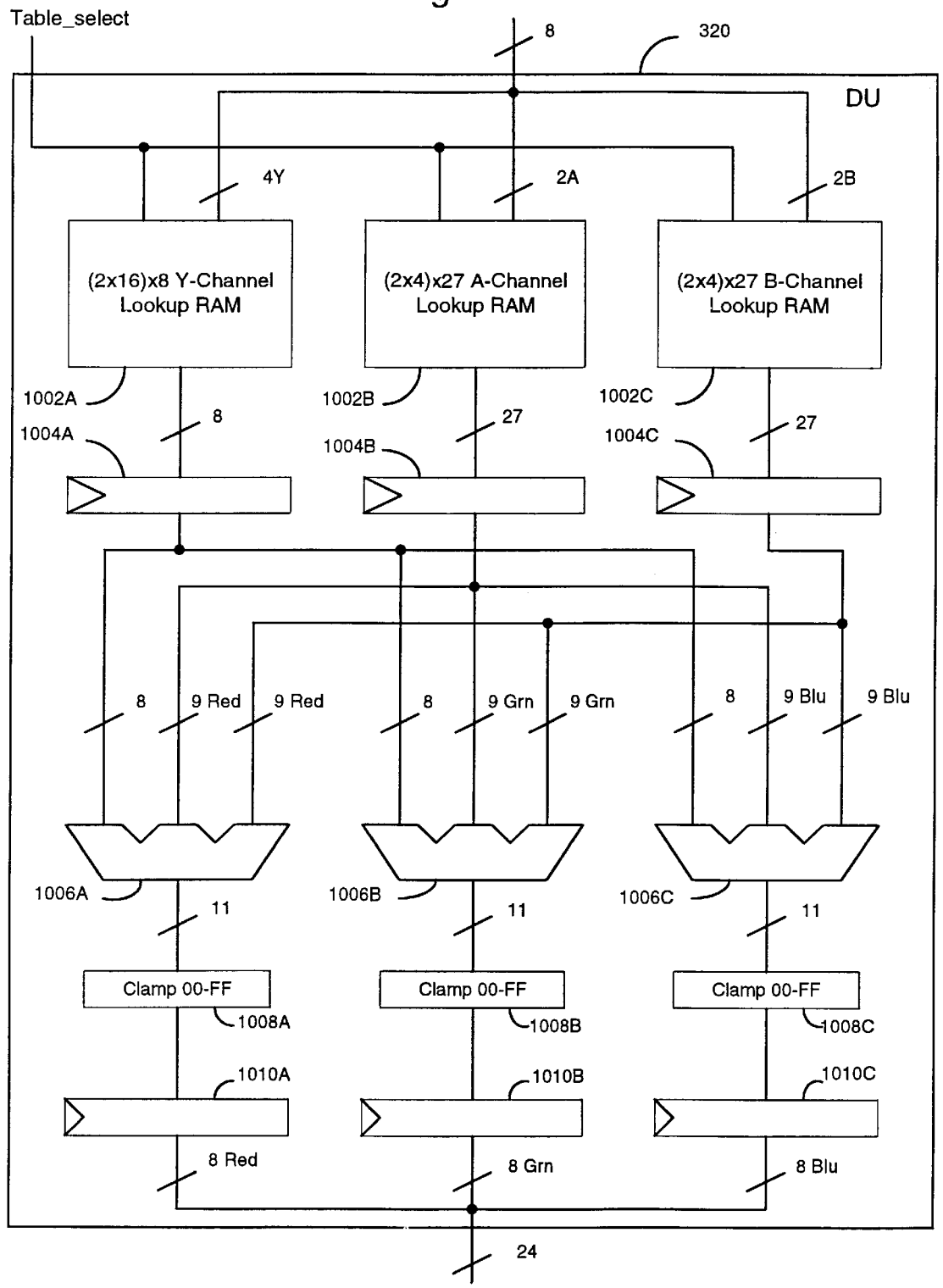
FIG. 10 is an illustration of the decompression unit according to the preferred embodiment of the present invention.
Figure 11:
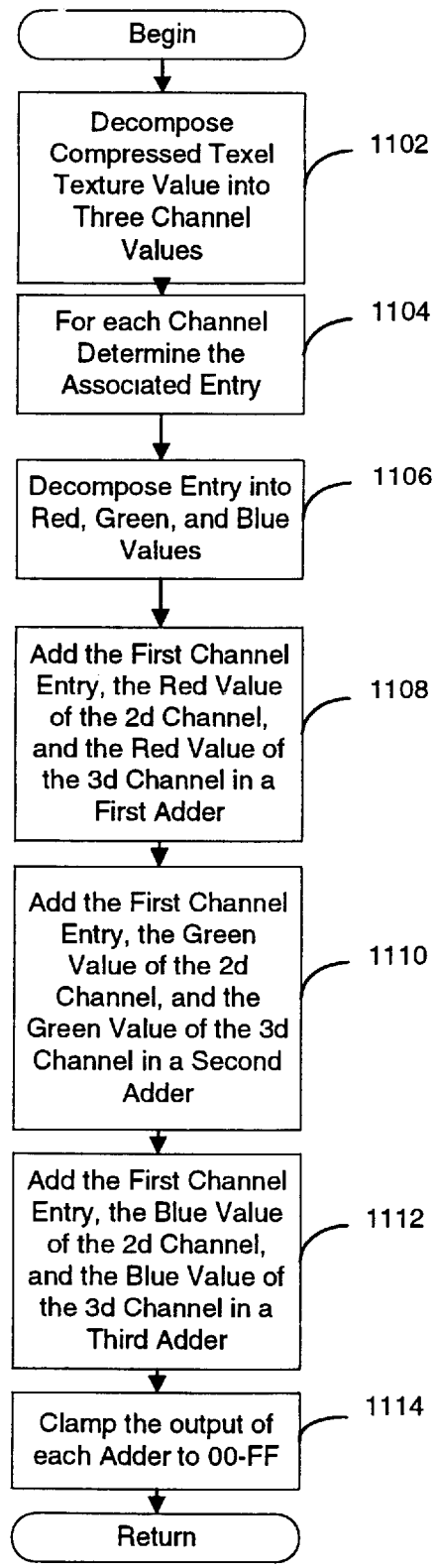
FIG. 11 is a flow chart of the operation of the decompression unit according to the preferred embodiment of the present invention.

FIG. 10 is an illustration of the DU 320 according to the preferred embodiment of the present invention. FIG. 11 is a flow chart of the operation of the DU 320 according to the preferred embodiment of the present invention. Each DU 320 includes a lookup RAM module 1002. The lookup RAM module 1002A–C can be in the form of three separate lookup RAM modules. For example, a Y-channel lookup RAM 1002A, an A-channel lookup RAM 1002B, and a B-channel lookup RAM 1002C. Each lookup RAM module 1002 is coupled to a clocked buffer 1004A–C for synchronizing the data transitions, the operation of which would be apparent to persons skilled in the relevant art. Each clocked buffer 1004 is coupled to three adders 1006. The output of each adder 1006 is coupled to a damper 1008 and the output of the damper 1008 is stored in a buffer 1010 until the next clock cycle. The output of the buffers 1010 is a 24-bit RGB888 value for the texel. The operation of the DU 320 is now described with reference to FIG. 11.

Each DU 320 receives a signal from the control register 324 identifying which of the two decompression tables stored in the lookup RAM module 1002 is associated with the 8-bit compression value for each texel. The storage capacity of the Y-channel lookup RAM 1002A is at least 128 bits for each decompression table. The 128 bits represent the sixteen 8-bit compression values, as described above. In the preferred embodiment, each Y-channel lookup RAM is large enough to store the Y-channel portions of two decompression tables, i.e., 256 bits (2×16×8 bits). The storage capacity of both the A-channel lookup RAM 1002B and the B-channel lookup RAM 1002C is at least 108 bits for each decompression table. The 108 bits represent the four sets of three 9-bit compression values, as described above. In the preferred embodiment, each Y-channel lookup RAM is large enough to store the Y-channel portions of two decompression tables, i.e., 216 bits (2×4×27 bits). The DU 320 decomposes 1102 the 8-bit compression value into three channel values, e.g., Y, A, and B. For the example described above, the 8-bit compression value for the texel whose non-compressed R,G,B value is (72.3, 80.8, 96.3) is 01010111. The four MSBs, i.e., 0101, represent the Y-channel index for the Y-portion of the decompression table, e.g., corresponding to decompression table addresses 0–3 in FIG. 7. The next two MSBs, i.e., 01, represent the A-channel index for the A-portion of the decompression table, e.g., corresponding to YAB addresses 4–7 in FIG. 7. The two least significant bits (LSBs), i.e., 11, represent the B-channel index for the B-portion of the decompression table, e.g., corresponding to YAB addresses 8–11. For each channel, the DU 320 determines 1104 the associated entry in the decompression table corresponding to the channel index. The Y-channel index, 0101, corresponds to the value "4e" (Hex) in decompression table address in the Y-channel lookup RAM 1002. A value of 4e (Hex) is equal to 78 decimal. As described above with respect to equation (2), when converting a YIQ value into a RGB value, the value of the Y-channel, e.g., 78, contributes equally to each of the red, green, and blue channels. Accordingly, the Y-channel value, 78, is transmitted to a red channel adder 1006A, a green channel adder 1006B, and a blue channel adder 1006C. The operation of the adders 1006 is described below.

The DU 320 uses the A-channel index, 01, to generate a 27-bit value representing the contributions of the A-channel value to the red, green, and blue channels. As described above with respect to equation (2) and FIG. 7, for the present example, the twelve values stored in the decompression table represent the four A-values illustrated in FIG. 6B, i.e., −27, −8, 9, and 28, multiplied by each of the I-channel coefficients shown in equation (2), i.e., 0.95, −0.28, and −1.11. Accordingly, the DU 320 does not include expensive multiplication hardware. Instead, the A-channel value, e.g., the I-channel value, and the B-channel value, e.g., the Q-channel value, have been converted to RGB values during the decompression table generation process in the compression module 122. Accordingly, the 27-bit entry associated with the A index, 01, is equal to 07e00409 (Hex). This 27-bit entry is three 9-bit entries representing the A-channel contribution to the red channel, green channel, and blue channel respectively. As described above, each 9-bit entry is in two's complement format. Accordingly, the A-channel, i.e., the I-channel, contributions to the red-channel, green-channel, and the blue-channel are equal to 31 8, 2, and 9 respectively. The red channel contribution is transmitted to the red channel adder 1006A, the green channel contribution is transmitted to the green channel adder 1006B, and the blue channel contribution is transmitted to the blue channel adder 1006C.

The DU 320 uses the B-channel index, 11, to generate a 27-bit value representing the contributions of the B-channel value to the red, green, and blue channels. As described above with respect to equation (2) and FIG. 7, for the present example, the twelve values stored in the decompression table represent the four B-values illustrated in FIG. 6C, i.e., −10, −5, 0, and 4, multiplied by each of the Q-channel coefficients shown in equation (2), i.e., 0.62, −0.64, and 1.73. As described above, the Y-channel value and the B-channel value have been converted to red channel values, green channel values, and blue channel values during the decompression table generation process in the compression module 122. Accordingly, the 27-bit entry associated with the B index, 11, is equal to 000bfa07 (Hex). This 27-bit entry is three 9-bit entries representing the B-channel contribution to the red channel, green channel, and blue channel respectively. As described above, each 9-bit entry is in two's complement format. Accordingly, the B-channel, i.e., the Q-channel, contributions to the red-channel, green-channel, and the blue-channel are equal to 2, −3, and 7 respectively. The red channel contribution is transmitted to the red channel adder 1006A, the green channel contribution is transmitted to the green channel adder 1006B, and the blue channel contribution is transmitted to the blue channel adder 1006C.

As described above, since the multiplication for converting a YAB value to a RGB value was performed during the compression process when the decompression table was generated, the DU 320 decompresses the texel merely by using adders 1006. Specifically, the red channel adder 1006A combines 1108 the received red channel contribution values for the Y-channel, the A-channel, and the B-channel. In the present example, the Y-channel contribution to the red channel is equal to 78, the A-channel (I-channel) contribution to the red channel is equal to (−8), and the B-channel (Q-channel) contribution to the red channel is equal to 2. The red channel adder 1006A combines or adds these three values to generate a red value equal to 72 (78−8+2). The green channel adder 1006B combines 1110 the received green channel contribution values for the Y-channel, the A-channel, and the B-channel. In the present example, the Y-channel contribution to the green channel is equal to 78, the A-channel (I-channel) contribution to the green channel is equal to 2, and the B-channel (Q-channel) contribution to the green channel is equal to −3 The green channel adder 1006B combines 1110 or adds these three values to generate a green value equal to 77 (78+2−3). Similarly, the blue channel adder 1006C combines 1112 the received blue channel contribution values for the Y-channel, the A-channel, and the B-channel. In the present example, the Y-channel contribution to the blue channel is equal to 78, the A-channel (I-channel) contribution to the blue channel is equal to 9, and the B-channel (Q-channel) contribution to the blue channel is equal to 7. The blue channel adder 1006A combines or adds these three values to generate a blue value equal to 94 (78+9+7). The output of each adder 1006 is clamped 1114 by an associated clamp 1008 to a value between 0 and 255 (FF Hex). The output of each clamp 1008 is an 8-bit signal representing the red channel component, green channel component, and the blue channel component of the appropriate texel. In the present example, the decompressed RGB texel value is equal to (72, 77, 94). In comparison, the uncompressed RGB texel value is equal to (72, 80, 96). This error is small in comparison to the speed and cost of the DU 320.

While the invention has been particularly shown and described with reference to a preferred embodiment, it will be understood by persons skilled in the relevant art that various change in form and details can be made therein without departing from the spirit and scope of the invention.

What is claimed is:

1. A method for decompressing a first texel value, comprising the steps of:

receiving a compressed texel representation including a first channel identifier, a second channel identifier, and a third channel identifier;

identifying first, second, and third color channel values from first, second, and third sets of compressed values based upon said first, second, and third channel identifiers, respectively including the steps of:

selecting a first memory location identified by said first channel identifier; and identifying said first color channel value as a value stored in said first memory location in a first storage device;

accumulating first, second, and third portions of said first, second, and third color channels to determine fourth, fifth, and sixth color channel values of the first texel including the step of:

performing an addition operation on said first portion of said first color channel, said second color channel, and said third color channel;

wherein said decompressed first texel value includes said fourth color channel value, said fifth color channel value, and said sixth color channel value; and compressing the first texel value of a first image, said first texel is represented using a first color space, including the steps of:

selecting a second color space using one of an automatic technique and a manual technique, said second color space not limited to a YIQ color space and an RGB color space, having said first color channel, said second color channel, and said third color channel, wherein said second color space more efficiently represents said first image than said first color space, said first color space used to display an image;

generating a first set of signals representing values in said first color channel;

generating a second set of signals representing values in said second color channel;

generating a third set of signals representing values in said third color channel;

generating a texel compression signal for a first texel, said texel compression signal including an indication of a closest value in each of said first set of values, said second set of values, and said third set of values;

converting said first set of signals to a first converted set of signals representing said first set of signals in said first color space;

converting said second set of signals to a second converted set of signals representing said second set of signals in said first color space; and converting said third set of signals to a third converted set of signals representing said third set of signals in said first color space.

2. The method of claim 1, wherein said identifying step includes the steps of:

identifying a first color channel value from a first set of compressed values based upon said first channel identifier;

identifying a second color channel value from a second set of compressed values based upon said second channel identifier; and identifying a third color channel value from a third set of compressed values based upon said third channel identifier.

3. The method of claim 1, wherein said accumulating step includes the steps of:

accumulating a first portion of said first color channel, said second color channel, and said third color channel, to determine a fourth color channel value of the first texel;

accumulating a second portion of said first color channel, said second color channel, and said third color channel, to determine a fifth color channel value of the first texel; and accumulating a third portion of said first color channel, said second color channel, and said third color channel, to determine a sixth color channel value of the first texel.

4. The method of claim 1, wherein said step of selecting a second color space includes the steps of:

select a third color space having an intensity color channel, an alpha color channel, and a beta color channel;

generating a histogram of values representing said first image generating a histogram of values of a first image, identifying a frequency that each color in said third color space is mapped to a texel in said first image; and identifying said third color space as said second color space if said third color space more closely matches the first image.

5. The method of claim 1, further comprising the steps of:

(a) initializing a hidden weight identified with each of a plurality of first hidden neurons, a plurality of second hidden neurons, and a plurality of third hidden neurons;

(b) identifying a input weight with each of a plurality of input neurons, each input neuron identified with a first weighting set, said weighting set including one first hidden neuron, one second hidden neuron, and one third hidden neuron, said input weight proportional to a combined weight of said first weighting set;

(c) selecting an input vector representing a texel value in said first image;

(d) determining a first input neuron having a input weight that most closely matches an input vector value of said input vector;

(e) modify said hidden weights of said first hidden neuron, said second hidden neuron, and said third hidden neuron identified with said first input neuron, to more closely match said input vector value;

(f) repeating steps (c)–(e) for all input vectors;

(g) determining an first error value for a vector cycle;

(h) repeating steps (a)–(g) for a plurality of vector cycles;

(i) identifying said plurality of first hidden neurons as said first set of compressed values;

(j) identifying said plurality of second hidden neurons as said second set of compressed values; and (k) identifying said plurality of third hidden neurons as said third set of compressed values.

6. The method of claim 5, wherein in step (c) said input vector is selected randomly.

7. The method of claim 6, further comprising the steps of:

matching said first texel with a first input neuron;

setting said first channel identifier to a value identifying a first hidden neuron identified with said first input neuron;

setting said second channel identifier to a value identifying a second hidden neuron identified with said first input neuron; and setting said third channel identifier to a value identifying a third hidden neuron identified with said first input neuron.

8. The method of claim 1, further comprising the step of:

compressing the first texel value of a first image, said first texel is represented using a first color space, including the steps of:

selecting a second color space having said first color channel, said second color channel, and said third color channel, wherein said second color space more efficiently represents said first image than said first color space, said first color space used to display an image;

generating a first set of signals representing values in said first color channel;

generating a second set of signals representing values in said second color channel;

generating a third set of signals representing values in said third color channel;

generating a texel compression signal for a first texel, said texel compression signal including an indication of a closest value in each of said set of values, said second set of values, and said third set of values;

converting said first set of signals to a first converted set of signals representing said first set of signals in said first color space;

converting said second set of signals to a second converted set of signals representing said second set of signals in said first color space; and converting said third set of signals to a third converted set of signals representing said third set of signals in said first color space.

9. The method of claim 8, wherein said step of selecting a second color space includes the steps of:

select a third color space having an intensity color channel, an alpha color channel, and a beta color channel;

generating a histogram of values representing said first image generating a histogram of values of a first image, identifying a frequency that each color in said third color space is mapped to a texel in said first image; and identifying said third color space as said second color space if said third color space more closely matches the first image.

10. The method of claim 1, wherein said first channel identifier includes four bits, said second channel identifier includes two bits, and said third channel identifier includes two bits, and wherein differences in said first color channel are more perceptible to users when compared to one of said second color channel and said third color channel.

11. The method of claim 1, wherein said fourth color channel value is identified with a red color channel, said fifth color channel is identified with a green color channel, and said sixth color channel is identified with a blue color channel.

12. The method of claim 1 wherein said second color space is a non-orthogonal color space.

13. A method for decompressing a first texel value, comprising the steps of:

receiving a compressed texel representation including a first channel identifier, a second channel identifier, and a third channel identifier of a first color space;

identifying first, second, and third color channel values from first, second, and third sets of compressed values based upon said first, second, and third channel identifiers, respectively;

accumulating first, second, and third portions of said first, second, and third color channels to determine fourth, fifth, and sixth color channel values of the first texel; and compressing the first texel value of a first image, said first texel is represented using a first color space, including the steps of:

selecting a second color space having said first color channel, said second color channel, and said third color channel, wherein said second color space more efficiently represents said first image than said first color space, said first color space used to display an image comprising the steps of:

selecting a third color space having an intensity color channel, an alpha color channel, and a beta color channel;

generating a histogram of values representing said first image;

generating a histogram of values of a first image, identifying a frequency that each color in said third color space is mapped to a texel in said first image; and identifying said third color space as said second color space if said third color space more closely matches the first image;

generating a first set of signals representing values in said first color channel;

generating a second set of signals representing values in said second color channel;

generating a third set of signals representing values in said third color channel;

generating a texel compression signal for a first texel, said texel compression signal including an indication of a closest value in each of said first set of values, said second set of values, and said third set of values;

converting said first set of signals to a first converted set of signals representing said first set of signals in said first color space;

converting said second set of signals to a second converted set of signals representing said second set of signals in said first color space; and converting said third set of signals to a third converted set of signals representing said third set of signals in said first color space;

wherein said decompressed first texel value includes said fourth color channel value, said fifth color channel value, and said sixth color channel value wherein said fourth, fifth, and sixth color channel values represent a second color space;

wherein said first texel is decompressed without performing a multiplication operation on said first, second, third, fourth, fifth, or sixth color channel values.

* * * * *

UNITED STATES PATENT AND TRADEMARK OFFICE
CERTIFICATE OF CORRECTION

PATENT NO. : 5,822,452

DATED : October 13, 1998

INVENTOR(S) : Gary Tarolli, Scott Sellers, James E. Margeson, III, Murali Sundaresan It is certified that an error appears in the above-identified patent and that said Letters Patent is hereby corrected as shown below:

In claim 8, column 22, line 52, replace "said set", with --said first set--.

Signed and Sealed this

Second Day of February, 1999

Attest:

Attesting Officer

*Acting Commissioner of Patents and Trademarks*